Patented Oct. 10, 1950

2,525,526

UNITED STATES PATENT OFFICE 2,525,526

PROCESS FOR PREPARING ALKENYL TRIFLUOROACETATES

Harry W. Coover, Jr., Theodore E. Stanin, and Joseph B. Dickey, Rochester, N. Y., assignors to Eastman Kodak Company, Rochester, N. Y., a corporation of New Jersey No Drawing. Application August 15, 1949, Serial No. 110,474

7 Claims. (Cl. 260—487)

This invention relates to a new and improved process for the preparation of alkenyl trifluoroacetates, and more particularly to a new and improved process for the preparation of vinyl and isopropenyl trifluoroacetates.

It has been previously disclosed that vinyl fluoroacetates can be prepared by the reaction of a fluoroacetic acid with acetylene in liquid phase and in the presence of a mercury salt catalyst. However, the process is cumbersome, involving a number of critical temperature control steps and further additions of the mercury salt catalyst after the reaction has been underway for some time. Also the yields of the vinyl fluoroacetates are relatively low with this liquid phase process. Various vinyl esters have also been prepared from acetylene and carboxylic acids by vapor phase processes. However, none of the vapor phase processes have been successfully applied to the preparation of highly halogenated vinyl esters. For example, when vapors of trichloroacetic acid are admixed with acetylene gas and passed over a heated catalyst containing a zinc or cadmium salt at the temperature range for practical operation of 150° to 260° C., no vinyl trichloroacetate is obtained. It was, therefore, not to be expected that vinyl trifluoroacetate could be produced by such vapor phase processes from trifluoroacetic acid and acetylene, and isopropenyl trifluoroacetate from trifluoroacetic acid and methylacetylene.

We have now found, however, that vinyl trifluoroacetate and isopropenyl trifluoroacetate can be prepared from trifluoroacetic acid and acetylene or methylacetylene by the herein-described vapor phase process and that the yields obtained of these unsaturates by the present process are relatively higher than those obtained by the liquid phase processes of the prior art.

It is, accordingly, an object of the present invention to provide a new and improved process for the production of vinyl and isopropenyl trifluoroacetates. It is a further object to provide a continuous process for the production of vinyl and isopropenyl trifluoroacetates characterized by relatively high yields of these unsaturates. Other objects will become apparent hereinafter.

According to the present invention, vinyl and isopropenyl trifluoroacetates are produced by a process which comprises reacting acetylene gas with trifluoroacetic acid to give vinyl trifluoroacetate and methylacetylene gas with trifluoroacetic acid to give isopropenyl trifluoroacetate, in the vapor phase in the presence of a catalyst comprising a compound of zinc or cadmium such as a salt of these elements with a saturated fatty acid containing from 1 to 12 carbon atoms (e. g. zinc formate, zinc acetate, zinc propionate, zinc butyrate, zinc valerate, zinc laurate, cadmium formate, cadmium acetate, cadmium propionate, cadmium butyrate, cadmium valerate, cadmium laurate, etc.), zinc oxide, zinc hydroxide, cadmium oxide, cadmium hydroxide, zinc trifluoroacetate and cadmium trifluoroacetate. The water-soluble salts of zinc and cadmium are preferred, and particularly zinc acetate. Mixtures of the above catalysts can be employed.

In the practice of the invention, the catalyst is supported on carbon or pumice stone, preferably on activated charcoal pellets impregnated with the zinc or cadmium compound. The reaction temperature can vary from 155° to 260° C., but more efficient conversion is obtained in the temperature range of 170 to 210° C. Advantageously, an excess of acetylene gas or methylacetylene gas is mixed with the vapors of the trifluoroacetic acid and the mixture is then preheated to a temperature of around 170° to 180° C. and passed into the reactor containing the heated catalyst. The vapors issuing from the reactor are condensed and the product recovered by subjecting the condensate to fractional distillation. Other well-known means for separating products from reaction mixtures can also be employed. While the relative amounts of the components in the gaseous mixture can be varied widely, even equimolecular proportions of acetylene gas or of methylacetylene gas and trifluoroacetic acid being operable, the best and preferred ratio is from 5 to 12 gram-moles of the acetylene gas or of the methylacetylene gas to each gram-mole of the trifluoroacetic acid. Advantageously the excess acetylene gas or methylacetylene gas can be recirculated through the system in continuous operation or recovered for batch operation. The catalyst can be prepared advantageously by adding the activated charcoal pellets to a saturated aqueous solution of the zinc or cadmium compound, and after thorough mixing, pouring off the excess solution (or filtering off the impregnated pellets) and drying the pellets in an oven at 100° C. for a period of about 24 hours. However, the impregnated pellets can be dried under other conditions which ensure a thoroughly dry and uniform catalyst.

The following examples will serve further to illustrate our new and improved process for preparing vinyl trifluoroacetate and isopropenyl trifluoroacetate.

Example 1.—Preparation of vinyl trifluoroacetate

Acetylene gas which was thoroughly washed and dried was passed at the rate of 1.7 gram-moles/hour over liquid trifluoroacetic acid maintained at a temperature between 25° and 32° C. The exposed surface of the acid was 20 square inches (equiv. to 129 sq. cms.). The amount of trifluoroacetic acid vaporized and carried along by the acetylene gas was 18.85 grams of acid/hour. This calculates to 10.0 gram-moles of acetylene gas to each gram-mole of the acid in admixture. This mixture was passed through a preheater tube maintained at a temperature of 175° to 185° C. and then passed over the heated zinc acetate catalyst in the reactor. The catalyst occupied a volume of 145 cc. The temperatures were measured in three separate zones of the catalyst mass and for the major portion of the run were maintained almost constantly as follows: top zone at 170° C., middle zone at 200° C. and bottom zone at 195° C. The vapors from the reactor were condensed and collected in dry ice traps. The reaction was run over a total period of 8.75 hours, during which time 14.88 gram-moles of acetylene and 1.49 gram-moles of the acid were passed through the preheater and the reactor. The amount of condensate collected was 169 grams which on fractional distillation yielded 149 grams of vinyl trifluoroacetate having a boiling range of from 37° to 39° C. and 13 grams of unreacted trifluoroacetic acid. The yield calculated to 79% by weight of vinyl trifluoroacetate based on the amount of trifluoroacetic acid used up in the reaction. The pure product had a refractive index of 1.3161 at 24° C.

In place of the zinc acetate catalyst in the above example, there can be substituted an equivalent amount of any of the other catalysts mentioned such as catalysts prepared with zinc and cadmium salts of saturated fatty acids containing from 1 to 12 carbon atoms, zinc oxide, zinc hydroxide, zinc trifluoroacetate, cadmium oxide, cadmium hydroxide or cadmium trifluoroacetates, to give similarly good yields of vinyl trifluoroacetate.

Example 2.—Preparation of isopropenyl trifluoroacetate

Thoroughly washed and dried methylacetylene gas was passed at the rate of 1.7 gram-moles per hour over liquid trifluoroacetic acid maintained at a temperature of between 25° and 32° C. and with 20 square inches (equiv. to 129 sq. cms.) of acid surface exposed to the methylacetylene gas. By this means 18.5 grams (0.167 mole) of the acid were vaporized per hour. The mixture to be reacted thus contained approximately 10 gram-moles of acetylene to each gram-mole of the acid vapor. The mixture so obtained was passed through a preheater tube maintained at a temperature of 176° to 185° C. and then passed over the heated zinc acetate catalyst in the reactor. The catalyst occupied a volume of 145 cc. The temperatures were measured in three separate zones of the catalyst mass, and for the major portion of the run, these temperatures were 170° C. in top zone, 200° C. in the middle zone and 195° C. in the bottom zone. The vapors coming out of the reactor were condensed and collected in dry ice traps. The total time of the run was 8.75 hours, during which time 14.88 gram-moles of methylacetylene and 1.46 gram-moles of the acid were passed in admixture through the preheater and over the catalyst in the reactor. The amount of condensate collected was 168 grams which on fractionation yielded 123 grams of isopropenyl trifluoroacetate having a boiling point of 63° to 65° C. and 11.4 grams of unreacted trifluoroacetic acid. The yield of isopropenyl trifluoroacetate caculated to 61.5% by weight based on the amount of trifluoroacetic used up in the reaction.

In place of the zinc acetate catalyst in the above example, there can be substituted an equivalent amount of any of the other catalysts mentioned such as catalysts prepared with zinc or cadmium salts of saturated fatty acids containing from 1 to 12 carbon atoms, zinc oxide, zinc hydroxide, zinc trifluoroacetate, cadmium oxide, cadmium hydroxide or cadmium trifluoroacetate to give similarly good yields of isopropenyl trifluoroacetate.

In practicing the process of the present invention, there is an initial rise in temperature when the reaction is first started, but on continued operation the temperatures become steady. The reaction is exothermic and consequently the heat input, required to maintain the reaction temperature in the reactor at the proper level prior to introducing the gaseous mixture of reactants, must be reduced somewhat once the reaction starts. The best results have been observed when the reaction has been under way for at least one hour. Moisture is decidedly detrimental to the efficiency of the present process and so the reactants are thoroughly dried before entering the preheater and reactor parts of the system. The presence of moisture favors the formation of acetaldehyde, which is difficult to separate from the product, and results in greatly lowered yields of the desired unsaturate. While pure acetylene and methylacetylene gases are preferred, mixtures of these gases containing minor proportions of other gases which are inert to the present process such as methane, ethane, ethylene, nitrogen, carbon dioxide, helium, and the like, can also be employed.

What we claim is:

1. A process for preparing an alkenyl trifluoroacetate which comprises reacting an unsaturated hydrocarbon selected from the group consisting of acetylene gas and methylacetylene gas and trifluoroacetic acid in vapor phase in the presence of a catalyst comprising activated carbon containing a compound selected from the group consisting of a zinc salt of a saturated fatty acid containing from 1 to 12 carbon atoms, a cadmium salt of a saturated fatty acid containing from 1 to 12 carbon atoms, zinc oxide, zinc hydroxide, zinc trifluoroacetate, cadmium oxide, cadmium hydroxide and cadmium trifluoroacetate, at a temperature of from 155° to 260° C., and separating the alkenyl trifluoroacetate which forms from the reaction mixture.

2. A process for preparing vinyl trifluoroacetate which comprises reacting a mixture of acetylene gas with trifluoroacetic acid in vapor phase in the presence of a catalyst comprising zinc acetate at a temperature of from 155° to 260° C., and separating the vinyl trifluoroacetate which forms from the reaction mixture.

3. A process for preparing isopropenyl trifluoroacetate which comprises reacting a mixture of methylacetylene gas with trifluoroacetic acid in vapor phase in the presence of a catalyst comprising zinc acetate at a temperature of from 155° to 260° C., and separating the isopropenyl trifluoroacetate which forms from the reaction mixture.

4. A process for preparing vinyl trifluoroacetate which comprises reacting acetylene gas and trifluoroacetic acid, in the proportions of from 5 to 12 gram-moles of the acetylene gas to each gram-mole of the trifluoroacetic acid, in vapor phase in the presence of a catalyst comprising zinc acetate at a temperature of from 170° to 210° C., and separating the vinyl trifluoroacetate which forms from the reaction mixture.

5. A process for preparing isopropenyl trifluoroacetate which comprises reacting methylacetylene gas with trifluoroacetic acid, in the proportions of from 5 to 12 gram-moles of the methylacetylene gas to each gram-mole of the trifluoroacetic acid, in vapor phase in the presence of a catalyst comprising zinc acetate at a temperature of from 170° to 210° C., and separating the isopropenyl trifluoroacetate which forms from the reaction mixture.

6. A process for preparing vinyl trifluoroacetate which comprises reacting acetylene gas with trifluoroacetic acid, in the proportion of 10.0 gram-moles of the acetylene gas to each gram-mole of the trifluoroacetic acid, in vapor phase in the presence of a catalyst comprising zinc acetate at a temperature of from 170° to 200° C., condensing the vapors from the reaction and separating the vinyl trifluoroacetate by fractional distillation of the condensate.

7. A process for preparing isopropenyl trifluoroacetate which comprises reacting methylacetylene gas with trifluoroacetic acid, in the proportion of 10.0 gram-moles of the methylacetylene gas to each gram-mole of the trifluoroacetic acid, in vapor phase in the presence of a catalyst comprising zinc acetate at a temperature of from 170° to 200° C., condensing the vapors from the reaction and separating the isopropenyl trifluoroacetate by fractional distillation of the condensate.

HARRY W. COOVER, Jr.
THEODORE E. STANIN.
JOSEPH B. DICKEY.

No references cited.